Figure 7:
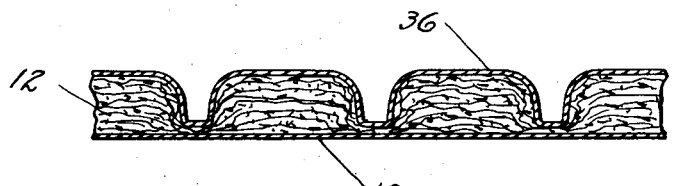

April 5, 1938. G. R. CUNNINGTON 2,113,128
SOUND INSULATION
Filed Oct. 25, 1935 2 Sheets-Sheet 1
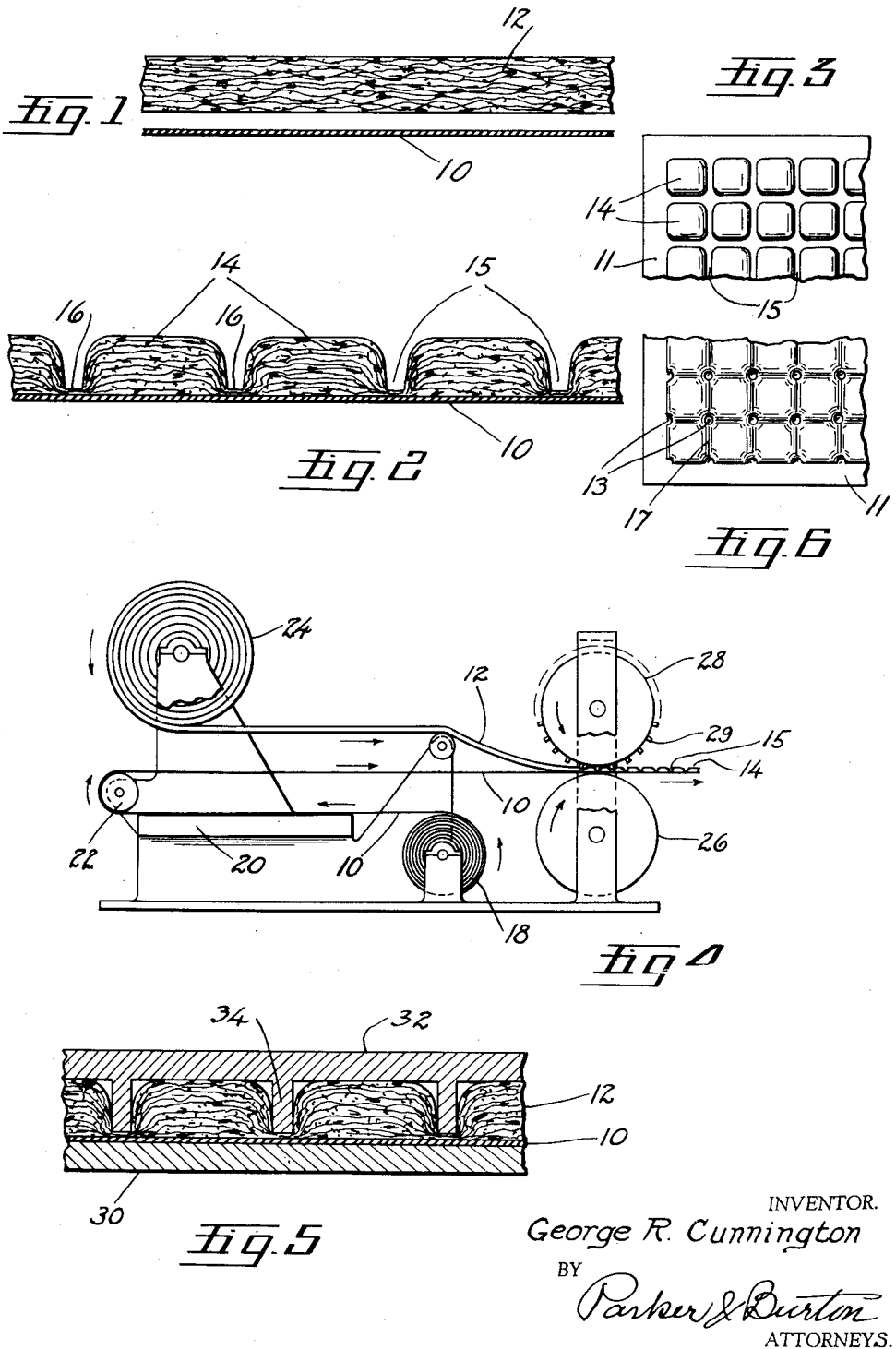
INVENTOR.
George R. Cunnington
BY
Parker & Burton
ATTORNEYS.

INVENTOR.
George R. Cunnington
BY Parker & Burton
ATTORNEYS.

Patented Apr. 5, 1938

2,113,128

UNITED STATES PATENT OFFICE 2,113,128

SOUND INSULATION

George R. Cunnington, Detroit, Mich., assignor to Woodall Industries Incorporated, Detroit, Mich., a corporation of Michigan Application October 25, 1935, Serial No. 46,725

4 Claims. (Cl. 154—44)

My invention relates to improvements in sound insulation material and improvements in methods of fabricating the same.

An object is to provide an improved insulating structure fabricated into a unitary article of the desired size and shape for the location where it is to be used.

My invention, as a structure, is here illustrated as embodied in an insulation panel adapted for application to the side wall or roof of an automobile body to minimize undesirable sounds and noises within the interior of the body. Obviously such a structure is adapted for use in other locations.

An important object relates to an improved method for cheaply and rapidly fabricating the insulating structure herein disclosed.

In the particular location, the interior of an automobile body, wherein my improved insulating structure is illustrated, undesirable noises arise from a multiplicity of sources. Such noises possess different characteristics. Sounds arise within the engine compartment or due to travel over the road, and these are transmitted either through the air or through mechanical connections to the interior of the passenger compartment of the vehicle. Due to the travel of the vehicle over the road or due to vibration arising within the vehicle from other causes, vibrations are set up within the side walls, roof, or floor panels of a vehicle which produce undesirable noises and which, reflected from other walls or panels, multiply and aggravate the noises within the body.

Certain of these objectionable noises are of low pressure and high frequency. Others, such as those produced by vibration of the body panels, are of high pressure and low frequency. One acoustical treatment will reduce and minimize one set of sounds while another acoustical treatment is better suited for minimizing and reducing other sounds.

The present type of automobile body construction, having a large expanse of curved wall panels, has increased the difficulty in that high sound pressure levels are produced throughout certain local areas within the body, such as within the rear upper corners of the passenger compartment. These sound waves are frequently so reflected as to concentrate and densify the sound pressure level to a very objectionable degree.

It is a purpose of my invention to provide a construction which will serve to minimize and reduce these sound pressure levels, to dampen the vibration, and to attenuate the combined transmitted and panel vibration generated sound energy.

My improved structure comprises a pad or sheet of loosely integrated fibrous fluffy flexible material formed preferably of a multiplicity of superimposed substantially parallel plies of filmy cobweb like cellulose crepe tissue adhesively quilted together at separated points or along spaced alines defining substantially uncompressed closely spaced apart areas or blocks of material. The permanent densification and adhesive quilting of this fluffy insulation material at the spaced apart points is preferably against a protective or supporting foundation layer. This foundation layer may be arranged on one outer surface or it may form an intermediate layer and it may comprise impervious to moisture resistant inert flexible fibrous material or it might consist of a layer of reticulated material. Preferably, the loosely integrated fluffy material carries a thermoplastic adhesive moisture resistant binder such as a suitable asphalt compound.

The quilting may be along lines defining square, rectangular, or circular blocks or domes of any desired shape and size and wherein the material is compressed and adhesively permanently compacted and sealed together along the lines which define the uncompacted portions or blocks. The blocks may be regular or irregular in arrangement and vary in size as well as shape and the quilting may be of such a character as to bring the cushion like fluffy fibrous material under widely varying degrees of compression, all as desired for the purpose for which the material is to be used.

On the other hand, the quilting and permanent densification of the material may be through spaced apart points of area rather than the line areas, which points define the blocks of substantially uncompressed material. In such construction the points of compression define the size and arrangement of the blocks and form the points of adhesive attachment of the insulation layer and the foundation layer.

In use as an acoustical treatment for an automobile, the fabricated pads or sheets may be secured to or within the wall structure of the vehicle body through adhesive attachment or through other suitable methods of attachment to overlie the wall panels. These pads may be secured to the wall panels through attachment of the foundation or supporting layer thereto or through attachment of the crowns of the dome areas thereto or the pad or sheet may be freely suspended to overlie the wall panel extending parallel to said wall panel as will be more fully described in certain other applications of this applicant assigned to the assignee of this application.

Figure 8:
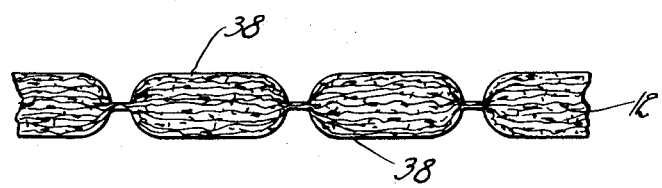
Figure 9:
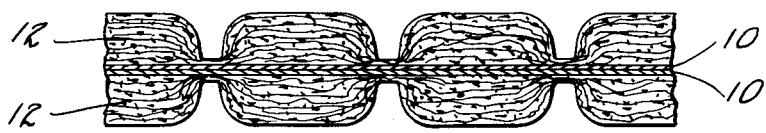
Figure 10:
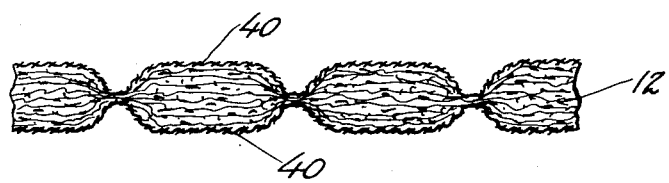

Other objects, advantages, and meritorious features of my invention will more fully appear from the following description, appended claims, and accompanying drawings, wherein:

Figure 1 is a cross-sectional view through two laminations of material which are employed by me in fabricating my improved structure, Fig. 2 is a cross-sectional view through the fabricated insulation structure formed of the layers of Fig. 1, Fig. 3 is a plan of a fragment of a panel embodying my invention, Fig. 4 is a diagrammatical view illustrating an improved process of fabricating my insulation, Fig. 5 is a diagrammatic illustration of a step in an improved process of fabricating my insulation, Fig. 6 is a plan of a fragment of a panel embodying my invention, Fig. 7 illustrates a modified form of my invention, Fig. 8 illustrates a second modified form of my invention, Figures 9 and 10 illustrate separate modified forms of my invention.

My improved insulation structure is built up of a plurality of laminations of material as hereinafter described. These are secured together to form a pad or quilted structure as illustrated in the several figures of the drawings.

In Figs. 1 to 7 there is a base or foundation layer 10 which may be of asphalt impregnated composition fibrous sheet material or other suitable material. This supporting layer is of such a character that the cellulose fibers are held together by a suitable moisture resistant thermoplastic compound such as an asphaltic composition binder. This layer is relatively dense. There is high internal friction between the constituent particles of the sheet. It possess thermoplastic characteristics. It is impervious to air and moisture resistant and inert. A product known commercially as X-crepe is suitable. This product comprises two sheets of asphalt impregnated double creped paper juxtaposed and secured in such relationship by a layer of a suitable asphalt binder. As the crepe paper is creped in two directions it is highly flexible and extensible without being appreciably resilient or vibratory in response to sound wave impact. It is tough and strong. This foundation lamination may be formed of considerably heavier stock if desired.

I propose to secure to this foundation layer a layer of loosely integrated fragile compressible composition cellular wadding. This wadding is preferably made up of material comprising a plurality of superimposed plies of filmy crepe paper stock wherein the constituent fibers are very loosely integrated and present a cob-web like appearance in the individual plies and extend substantially parallel to the plane of the material. The constituent fibers in the several plies are coated with suitable moisture resistant thermoplastic material, particles of which are scattered through the several layers, adhesively securing them together. A commercial product known as Waddex-T has been found suitable. In this material the several plies are substantially parallel with air spaces therebetween. This material is easily compressible. It is thermoplastic. It is highly sound absorbing. It also possesses thermal insulation value. Such layer is indicated as 12 and in Fig. 1 it is shown before fabrication while in Fig. 2 it is illustrated as combined with the layer 10.

This insulation lamination 12 is thermoplastically quilted or secured to the foundation layer. In Fig. 3 it is quilted thereto along a plurality of lines which define dome-like protuberances 14 separated from each other by the line cavities 15 formed by the lines of compression. Around the periphery of the base of each dome element 14 the layer 12 is compacted and permanently densified interiorly and secured to the foundation layer as at 16. Throughout this area of densification the several plies which make up the lamination 12 are permanently thermoplastically compacted together holding the material permanently to its compacted state. This is the construction shown in Fig. 3. In Fig. 6 the material is thus compacted at the corners 13 only. In Fig. 6 between the corners along the lines 17 the wadding may be slightly compressed or compacted to more definitely outline the quilted character of the structure.

The pad may be compacted along its margin as at 11 if desired.

Throughout the entire interior of each individual dome element the several layers which make up the lamination 12 are arranged substantially in parallelism and parallel to the outer surface of the dome using the term "parallelism" generally and as indicated in the drawings. These several films spread out fan-like from the base to substantial parallelism at the peak of the dome, which peak may be flattened as shown in Fig. 2.

A suitable method of fabricating this structure is shown in Fig. 4 in diagram. In this figure a roll 18 of the foundation material 10 is suitably supported for unwinding and withdrawal over a plate 20, which plate is heated in any desired manner. The material then passes over an idler roll 22. A roll of loosely integrated insulation wadding, indicated as 24, is suitably supported for unwinding and withdrawal to be brought into juxtaposition with the heated surface of the layer 10 and to pass therewith between rolls 26 and 28.

The roll 26 may have a plane surface to take the thrust from the roll 28 which is formed with a plurality of protuberances 29. These protuberances are shaped as desired to compact the insulation layer 12 against the foundation layer 10 to form the lines of compression 15 or the points of compression 13 in the insulation layer producing the dome-like protuberances or blocks 14, at the base of which the material is thermoplastically densified and adhesively secured to the foundation layer, either along the lines 15 or at the points 13, with the interior structure of the dome free from such compression and densification.

The same end may be accomplished by a stamping operation between two plates as shown in Fig. 5 wherein a plate 30 takes the thrust and upon which the two layers 10 and 12 are supported to be acted upon by plate 32 which is provided with protuberances 34 adapted to so compact and compress the layer 12 as to form the cavities therein which define the dome-like protuberances 14 hereinabove described.

Such a structure may then be secured to overlie a metal panel or side wall area of an automobile body. The foundation layer may be secured to the metal panel and serves to vary the natural period of vibration of the panel, dampening the vibration and minimizing the tendency of the panel to vibrate and produce high sound areas within the interior of the body. It also acts upon the panel to vary its driven vibration period and to modify the same.

The preformed layer 12 of highly porous wadding not only absorbs the sound waves striking the same causing certain waves to become ensnarled within the interior thereof but the tendency of such waves to be reflected is minimized and reduced as they pass over and into the cavities 15 between the domes 14 and into the multiplicity of superimposed layers of loose cellular films which makes up each dome. These multiple walls act as a multiplicity of barriers through which the high pressure low frequency sound waves must pass to strike the foundation layer and their effectiveness for the production of undesirable sounds is materially reduced.

My improved structure may be employed in any way desired. The foundation layer need not directly juxtapose the metal panel or be secured thereto, if the same is used with a metal panel. Any acoustical treatment desired may be followed. The present application is directed to the structure per se and not to its method of use or association with other elements.

The sound waves which enter the dome structures, whether from above striking them on top or impinging against the sides thereof, strike substantially perpendicular to the plurality of plies which make up each dome and must of necessity pass through said several plies to impinge the foundation layer which acts as a diaphragm dissipator.

The effect produced may be varied as desired by varying the shape, size, and contour of the dome-like structures and the intervening cavities. Each dome structure is substantially free from the foundation layer except around the base of the dome where the intervening material in densified form is thermoplastically welded to the foundation layer due to the presence of the thermoplastic binder in the foundation layer as well as the insulation layer.

The construction of Fig. 7 differs from the construction of Figs. 2 and 3 in that the wadding material 12 is provided with an overlying layer 36 of material similar to the foundation layer 10 thereby providing a quilt like construction wherein the wadding is interposed between two outer protective layers of X-crepe or the like. The construction of the foundation layer 10 is as hereinabove described.

With the insulation material formed as shown in Fig. 7 wherein it is protected on both sides by the protective layer it is in such a form that it may be readily handled without any destructive effect upon the wadding and the durability of the two outer layers thoroughly protects the fragile filmy interposed wadding layer. The wadding may if desired be of the filmy crepe tissue without asphalt impregnation and be sealed through at the points or along lines between the outer layers by migration of binder material drawn from the asphalt impregnated outer layer or added thereto. The thermoplastic quilting or welding of the insulation lamination against the foundation layer is primarily due to the asphalt of the foundation layer as this is in the form of a free asphalt readily responsive to heat and pressure to weld the material in compacted form while the asphalt particles carried in the wadding are not ordinarily of such a character as to be so readily responsive to such compacted permanent adhesive densification.

As hereinabove set forth the quilting of the construction of Fig. 6 is somewhat different from that illustrated in Figs. 2 and 3 in that the wadding material shown in the construction of Fig. 6 is thoroughly compacted and densified only at the corners 13, and along the lines 17 extending between the corners 13 and defining the uncompacted domes the wadding is only partially compressed and densified. These points of compression may be regular or staggered in successive lines, the object being that at certain predetermined points the material is thermoplastically quilted to the foundation layer while between these points the wadding is uncompressed. It is apparent that the construction of Fig. 3, wherein there is no covering layer 36, might be quilted in the manner of Fig. 7 with points rather than lines of compacted densification if desired.

Fig. 8 illustrates another modified form of construction wherein a relatively thick layer of loosely integrated fluffy insulation wadding of the character heretofore described and possessing self-contained adhesive or thermoplastic characteristics, due to the presence of adhesive or thermoplastic binder particles therein and impregnation thereby, is subjected to a quilting treatment whereby the layer is permanently compacted or compressed along the lines or at spaced apart points defining substantially uncompressed blocks or domes 38. The material is densified as illustrated at 38 with blocks or domes projecting on both sides normal to an intermediate plane established by the densified areas. This structure is shown without any protective outer covering layer but such covering material might be provided if deemed desirable.

The structure illustrated in Fig. 9 is built up of two pads or sheets such as are shown in Fig. 3 with the base or foundation layers 10 juxtaposed and adhesively secured together into two outer layers 12 compacted from both sides against the two-ply intermediate base layer as illustrated. If desired two layers of Waddex may be arranged one on each side of an adhesive impregnated base layer and compacted thereagainst as described instead of employing two base layers as hereinabove described. The fluffy insulation layers are adhesively or thermoplastically quilted and permanently compacted against and secured to the base layer along lines or spaced apart points defining substantially uncompressed blocks or domes as shown.

In the construction of Fig. 10 the fluffy loosely integrated insulation layer 12 is provided on one or both sides (here shown on both sides) with an outer retaining layer of open mesh material such as cheese cloth or scrim 40 which, while holding the fibers of the insulation layer in place permits the ready flow of the sound waves therethrough. Additional binder material may, if desired, be supplied to effect the adhesive securement of the fibrous layers together at points or along the lines of compression, particularly in case the fluffy insulation layer is not self impregnated with adhesive material or in case the outer or foundation layer does not carry a migratory adhesive thermoplastic binder.

What I claim:

1. An insulation structure comprising a foundation layer, a layer of loosely integrated fluffy fibrous wadding substance having thermoplastic material distributed therethrough compacted against and adhesively secured to the foundation layer at spaced apart points defining substantially uncompacted blocks throughout which the wadding is free from the foundation layer.

2. An insulation structure comprising a foundation layer formed of relatively dense tough flexible asphalt impregnated thermoplastic cellulose material and an insulation layer of loosely integrated wadding material comprising a plurality of superimposed substantially parallel plies of loose fibrous filmy crepe asphalt impregnated cellulose material compacted thereagainst and thermoplastically secured thereto throughout areas defining a plurality of substantially uncompacted dome like areas made up of a multiplicity of plies of wadding like material relatively free and independent of each other and providing a multiplicity of superimposed plies throughout the interior of the dome portion and disconnected from the foundation layer throughout the interior of the dome area.

3. An insulation structure comprising a foundation layer formed of tough relatively dense asphalt impregnated crepe paper and an insulation layer of wadding many times the thickness of the foundation layer and formed of a plurality of superimposed plies of very loosely integrated asphalt impregnated crepe paper, said wadding layer compacted and permanently densified together and secured to the foundation layer at spaced apart points defining substantially uncompacted areas separated from each other by said permanently compacted points of densification, said wadding layer being unsecured to said foundation layer throughout said uncompacted areas.

4. A laminated insulation structure comprising an intermediate foundation layer of fibrous material and two layers of loosely integrated fluffy fibrous substance having thermoplastic material distributed therethrough arranged on opposite sides of the foundation layer and thermoplastically compacted thereagainst and adhesively quilted thereto throughout spaced apart areas defining substantially uncompressed correspondingly disposed dome like areas, said layers of fluffy material being unsecured to the foundation layer throughout the uncompressed dome like areas thereof.

GEORGE R. CUNNINGTON.